(12) United States Patent
Laliberte

(10) Patent No.: US 7,257,387 B2
(45) Date of Patent: Aug. 14, 2007

(54) METHOD AND SYSTEM FOR EMERGENCY CONTROL OF A VOICE/DATA COMMUNICATIONS DEVICE

(75) Inventor: Donald R. Laliberte, Lawrenceville, GA (US)

(73) Assignee: AT&T Intellectual Property, Inc., Wilmington, DE (US)

( * ) Notice: Subject to any disclaimer, the term of this patent is extended or adjusted under 35 U.S.C. 154(b) by 117 days.

(21) Appl. No.: 10/880,837

(22) Filed: Jun. 30, 2004

(65) Prior Publication Data

US 2006/0009190 A1  Jan. 12, 2006

(51) Int. Cl.
H04M 11/04 (2006.01)
(52) U.S. Cl. ............... 455/404.1; 455/418; 455/419
(58) Field of Classification Search ............ 455/404.2, 455/521, 404.1, 408, 414.2, 9, 418, 419; 379/33, 42, 38, 45, 37; 370/352
See application file for complete search history.

(56) References Cited

U.S. PATENT DOCUMENTS

| | | | |
|---|---|---|---|
| 6,529,500 B1 | 3/2003 | Pandharipande | |
| 6,603,977 B1 | 8/2003 | Walsh et al. | |
| 6,661,785 B1 | 12/2003 | Zhang et al. | |
| 6,665,611 B1 | 12/2003 | Oran | |
| 6,674,745 B1 | 1/2004 | Schuster et al. | |
| 6,678,357 B2* | 1/2004 | Stumer et al. ............... | 379/45 |
| 6,771,742 B2* | 8/2004 | McCalmont et al. ......... | 379/45 |
| 6,868,074 B1 | 3/2005 | Hanson | |
| 6,912,399 B2 | 6/2005 | Zirul et al. | |
| 6,940,950 B2* | 9/2005 | Dickinson et al. ............ | 379/45 |
| 2002/0072348 A1 | 6/2002 | Wheeler et al. | |
| 2002/0169570 A1 | 11/2002 | Wang | |
| 2003/0211839 A1* | 11/2003 | Baum et al. ................ | 455/403 |
| 2004/0057425 A1* | 3/2004 | Brouwer et al. ............ | 370/352 |
| 2004/0101123 A1 | 5/2004 | Garcia | |
| 2004/0140928 A1 | 7/2004 | Cleghorn | |
| 2005/0047574 A1 | 3/2005 | Reid | |
| 2005/0063519 A1* | 3/2005 | James ....................... | 379/45 |
| 2005/0151642 A1* | 7/2005 | Tupler et al. .......... | 340/539.18 |
| 2005/0175166 A1* | 8/2005 | Welenson et al. ...... | 379/265.02 |
| 2005/0190892 A1* | 9/2005 | Dawson et al. ............. | 379/37 |
| 2005/0232243 A1 | 10/2005 | Adamczyk | |
| 2005/0250468 A1 | 11/2005 | Lu | |

OTHER PUBLICATIONS

"Helpless In A 911 Emergency: Some Internet Phone Services Leave Consumers Without A Lifeline," Newsday, Richard J. Dalton, Jr., May 11, 2005, pp. 1-3.

(Continued)

Primary Examiner—Duc M. Nguyen
Assistant Examiner—Chuck Huynh
(74) Attorney, Agent, or Firm—Bambi F. Walters; Geoff Sutcliffe; Todd Mitchem

(57) ABSTRACT

Emergency remote control communications systems and methods provide remote access to, activation of, deactivation of, monitoring of, communications with, and/or otherwise management of a Voice-Over Internet Protocol (VoIP) communications device (and/or another peripheral communications device) in response to an emergency communication originating from the VoIP communications device. An emergency remote control communications software product detects an emergency communications signal, and, in response, generates an emergency remote control communications signal for communication to the VoIP communications device via a communications network.

20 Claims, 9 Drawing Sheets

OTHER PUBLICATIONS

"Tests Show Many Cellphone Calls to 911 Go Unlocated", The Wall Street Journal, by Anne Marie Squeo, May 19, 2005, pp. 1-3.
FCC to Rule on 911 Access for Web Phones, Washington Post, by Yuki Noguchi, Washington Post Staff Writer, May 18, 2005, pp. 1-3.
BellSouth Clarifies View on VoIP '911' Availability, TR Daily, by Lynn Stanton, May 17, 2005, p. 1.
"Level 3 Communications Sees 911 as its Edge in Internet Telephony", by Heather Draper, Dow Jones Newswires, Jun. 29, 2005, pp. 1-2.
"FCC Addresses VoIP 911 Cells", BellSouth NewsSource from Staff and News Services, by Russell Grantham, May 6, 2005, p. 1.
"AG Files Suit Against Vonage Over '911'", BellSouth NewsSource, by Ted Gotsch, May 5, 2005, pp. 1-2.
"FCC Boss Pushes 911 Plan", BellSouth NewsSource from Staff and News Services, by Renee DeGross, Apr. 26, 2005, pp. 1-2.
Bells Ringing in Net Phone 911—CNET News.com by Ben Charny, staff writer, *Daily Clips*, Mar. 7, 2005.
U.S. Appl. No. 10/024,135, filed Dec. 2001, Ruckart et al.
U.S. Appl. No. 11/318,110, filed Dec. 2005, Lu.
Author not Available, "VoIP Patent Applied For," Techweb News.
Author not Available, "VoIP Emergency Calling Services," Intrado Informed Response, 2003 Intrado Inc., Longmont, Colorado, USA.
"VoIP Patent Applied For", Techweb News, Author and Date Unknown, p. 1.
"Bells Ringing in Net Phone 911", CNET News.com by Ben Charny, staff writer, *Daily Clips*, Mar. 7, 2005, pp. 1-2.
"VoIP Emergency Calling Services," Intrado Informed Responses, 2003, Author not Available, Intrado Inc., Longmont, Colorado, USA, pp. 1-2.
"BellSouth E911 Service Interfaces to Customer Premises Equipment at a Public Safety Answering Point", Technical Reference, Issue 6, TR73528, Apr. 2001.
"The Development of 9-1-1", http://www.sorc911.com/9-1-1-%20History.htm, May 21, 2004.

\* cited by examiner

METHOD AND SYSTEM FOR EMERGENCY CONTROL OF A VOICE/DATA COMMUNICATIONS DEVICE

CROSS REFERENCE TO RELATED APPLICATIONS

This application relates to applicant's co-pending application entitled "E911 Systems and Methods for VoIP/VoN," filed on Apr. 30, 2004, and of which the "Brief Summary of the Invention" and "Detailed Description of the Invention" sections are incorporated herein by this reference.

This application relates to applicant's co-pending application entitled "Method and System for Routing Emergency Data Communications," filed on May 27, 2004, and of which the "Brief Summary of the Invention" and "Detailed Description of the Invention" sections are incorporated herein by this reference.

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but otherwise reserves all copyrights whatsoever.

BACKGROUND OF THE INVENTION

1. Field of the Invention

This invention generally relates to Internet telephony, and, more particularly relates to methods for activating, monitoring, and/or otherwise managing a Voice-Over Internet Protocol (VoIP) communications device when an emergency communication originates from the VoIP communications device.

2. Description of Related Art

Internet telephony, also referred to herein as Voice-Over Internet Protocol (VoIP), Voice-Over Network (VoN), and/or Internet Protocol Telephony (IP Telephony), is experiencing explosive growth and marked improvements in reliability and sound quality. The improved Internet telephony communications are, in large part, due to upgrading the internet backbone with better switching fabrics, such as Asynchronous Transfer Mode (ATM), and also due to implementation of new communications standards, such as standards for transport protocols, directory services, and/or audio codec format.

Along with these improvements comes new challenges for the industry. For example, a need exists for better, more efficient emergency services in response to an emergency communication from an Internet telephony communications device. When an individual uses a conventional telephone to request an emergency service, such as dialing 9-1-1 to connect with a Public Safety Answering Point (PSAP), the telecommunications network uses network information associated with the communication (e.g., Automatic Number Identification (ANI), Automatic Location Identification (ALI), enhanced 9-1-1 services, and so on) to route the emergency call to a matched Public Safety Answering Point (also referred herein as an "emergency call center" or as PSAP). The emergency call center then uses the network information and/or additional information from a caller to dispatch one or more appropriate emergency service providers. Typically, the emergency service provider is matched with a geographic location, such as a billing address, of the telephone used to dial an emergency phone number to request the emergency service. However, when the caller uses a VoIP phone to request the emergency service, problems exist with routing and with dispatching appropriate emergency service providers. For example, if the caller uses a wireless VoIP communications device, then the wireless VoIP communications device may be used at different geographic locations to make the request for the emergency service, and consequently some network information, like the billing address, is not reliable for routing and/or other processing of the emergency service request to a nearby emergency service provider that is equipped to respond to the emergency request.

The growing popularity of wireless VoIP communications devices brings attention to the above and other emergency communication problems. Accordingly, what is needed are methods and systems for locating, routing, and/or other processing of emergency communications from internet telephony communications devices. Additionally, methods and systems that leverage the abilities of internet telephony communications devices and/or a connected communications network are further needed for these emergency communications.

SUMMARY OF THE INVENTION

This invention addresses the above needs and other needs by providing methods, systems, computer programs, and computer program products to remotely access, activate, deactivate, monitor, communicate with, and/or otherwise manage a Voice-Over Internet Protocol (VoIP) communications device (and/or another peripheral communications device in proximity to or in communications with the VoIP communications device) in response to an emergency communication originating from the VoIP communications device.

Typically, a calling party uses the VoIP communications device to communicate an emergency communications signal over a telecommunications network and/or a data network to an emergency communications address, or alternatively, to a public safety answering point (PSAP) associated with the emergency communications signal (e.g., a 911 call for help). The telecommunications network and/or the data network detects, decodes, and/or connects the emergency communications signal to the emergency communications address or to an associated PSAP (or other associated emergency response center) and establishes a communications link. A responder communications device of the emergency communications address detects and decodes the emergency communications signal to obtain a communications address of the VoIP communications device (and/or of the peripheral communications device), emergency information, an emergency data communications address, and/or remote activation information. Thereafter, an emergency remote control computer software product (also referred to herein as the "Emergency Remote Control Communications Module (ERCCM)") of the responder communications device (i.e., the responder communications device and/or another voice and/or data communications device of an emergency service provider, or, alternatively a telecommunications and/or data network component) generates an emergency remote control communications signal for communication with the VoIP communications device (and/or peripheral hardware and equipment) via the telecommunications network and/or the data network. When a communications link between the VoIP communications device (and/or peripheral hardware equipment) and the responder communications device communicates the emergency remote control communications signal, the emergency remote control communications signal instructs and/or commands access to, monitoring of, activation of, deactivation, and/or other management of subsystems of the VoIP communications device (and/or the peripheral hardware and equipment). For example, the responder communications device may use the remote activation information that identifies and provide operating parameters for a location position system of the VoIP communications device. And, the Emergency Remote Control Communications Module may generate an emergency remote control communications signal to activate the location co-ordinate system of the VoIP communications device and receive up-to-date and/or real time positioning information of the VoIP communications device. In addition, the emergency remote control communications signal may instruct the telecommunications network and/or data network (and/or the VoIP communications device) to not activate and/or to deactivate an alert of an incoming communication from the responder communications device. For example, if the calling party of the VoIP communications device calls to report a violent crime, a kidnapping, and/or another sensitive emergency and the communications link is interrupted and/or terminated, then the responder communications device may communicate the emergency remote control communications signal with instructions to the telecommunications network, the data network, and/or the VoIP communications device (and/or peripheral hardware and equipment) to quietly connect the emergency remote control communications signal without activating an alert such as a ringer, vibrator, visual indicator (e.g., flashing light), and/or another sensory device of the VoIP communications device (and/or peripheral hardware and equipment).

According to embodiments of this invention, a method of processing a emergency remote control communications signal includes receiving an emergency communications signal from a voice/data communications device (e.g., a VoIP communications device) to an emergency responder communications device, using the emergency communications signal to generate a emergency remote control communications signal, and communicating the emergency remote control communications signal to the communications address of the emergency site communications device. The emergency communications signal may include a communications signal, a communications address for communicating with an emergency site communications device (e.g., the VoIP communications device and/or peripheral hardware and equipment), remote activation data associated with the emergency site communications device, emergency data, and/or an emergency data communications address for accessing the emergency data. And, the emergency remote control communications signal may include a response communications signal (e.g., voice signal, text messaging signal, video signal, and/or others), the communications address of the emergency site communications device, a responder's communications address, a control parameter for accessing the emergency site communications device, a control parameter for activating the emergency site communications device, a control parameter for deactivating the emergency site communications device, a control parameter for monitoring the emergency site communications device, a control communications parameter for communicating with the emergency site communications device, and/or an override parameter for terminating the emergency remote control communications signal. The emergency remote control communications signal may be communicated from a responder communications device as well as from an associated communications network to the communications network processing the emergency remote control communications signal to the emergency site communications device. When, the emergency remote control communications signal is communicated to the emergency site communications device, the emergency remote control communications signal instructs and/or otherwise controls access to, activation of, deactivation of, communications with, monitoring of, and/or otherwise management of the emergency site communications device. Thereafter, the emergency site communications device responds to the instruction and may communicate a response and/or a status to the instruction.

In further embodiments, the method includes communicating the emergency remote control communications signal to the emergency site communications device via a telecommunications network (e.g., Public Switched Telephone Network, Mobile Switching Telephone Office, and/or a Private Branch Exchange), a satellite network, a data network, and/or a remote server/database. Still other embodiments include the above method with alternate communications devices (i.e., communications devices other than a VoIP phone), such as, for example, a personal computer, a server, a laptop, a pager, a personal digital assistant, a musical recording device, a digital signal processor, and an Interactive Television.

According to other embodiments of this invention, a computer program product includes a computer-readable medium and an Emergency Remote Control Communications Module stored on the computer readable medium. The Emergency Remote Control Communications Module detects an emergency communications signal and generates a emergency remote control communications signal to control access to, activation of, deactivation of, communications with, monitoring of, and/or management of an emergency site communications device (e.g., a VoIP communications device and/or peripheral communications hardware and equipment). In further embodiments, the Emergency Remote Control Communications Module initiates communication of the remote control communication signal to a communications network for processing and communication to the emergency site communications equipment. Similar to the above embodiments, the remote control communications signal may include a response communications signal, a communications address of an emergency site communications device, a communications address of the responder communications device, a control parameter for accessing the emergency site communications device, a control parameter for activating the emergency site communications device, a control parameter for deactivating the emergency site communications device, a control parameter for monitoring the emergency site communications device, a control communications parameter for communicating with the emergency site communications device, and/or an override parameter for terminating the remote control communications signal. According to various embodiments, the computer-readable medium may be stored in a VoIP communications device, a personal computer system, a communications network, an alternate communications device, and/or a remote data server.

According to additional embodiments of this invention, an emergency remote control communications system includes a responder communication device having an Emergency Remote Control Communications Module and a communications network establishing a communications link between the responder communications device and an emergency site communications device. Similar to the above embodiments, the Emergency Remote Control Communications Module detects an incoming emergency communications signal from a voice/data communications device and, in response to the emergency communications signal, generates a remote control communications signal that is communicated to the communications network. The communications network processes the remote control communications signal and communicates the remote control communications signal to the emergency site communications device. The remote control communications signal remotely controls access to, activation of, deactivation of, monitoring of, communications with, and/or management of the emergency site communications device.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

The above and other embodiments, objects, uses, advantages, and novel features of this invention are more clearly understood by reference to the following description taken in connection with the accompanying figures, wherein.

DETAILED DESCRIPTION OF THE INVENTION

Figure 1:
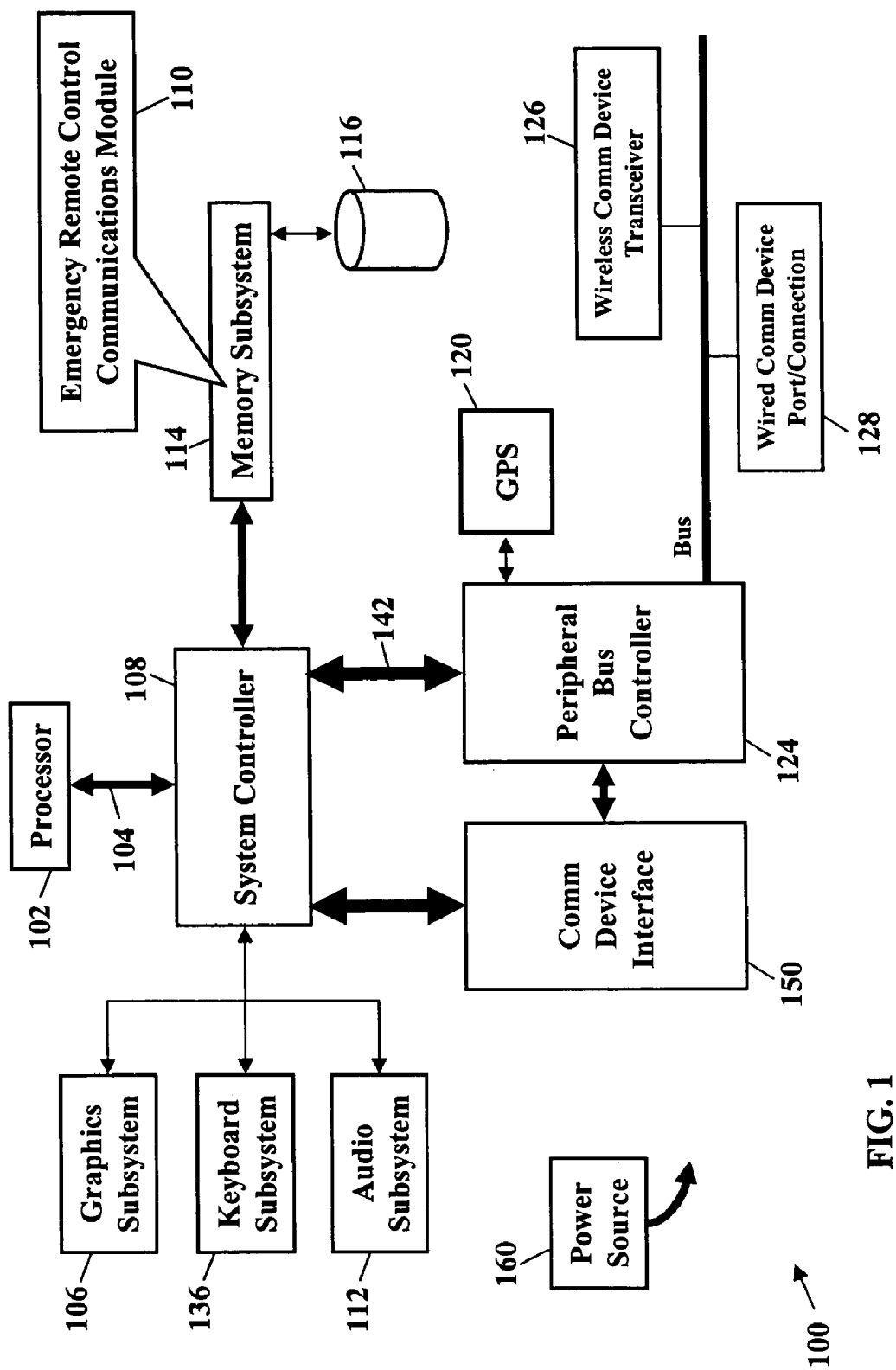
FIG. 1 illustrates a block diagram of an operating system according to the embodiments of this invention.

This invention now will be described more fully hereinafter with reference to the accompanying drawings, in which exemplary embodiments are shown. This invention may, however, be embodied in many different forms and should not be construed as limited to the embodiments set forth herein. These embodiments are provided so that this disclosure will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, flowcharts, illustrations, and the like represent conceptual views or processes illustrating systems, methods and computer program products embodying this invention. The functions of the various elements shown in the figures may be provided through the use of dedicated hardware as well as hardware capable of executing associated software. Similarly, any communications networks shown in the figures are conceptual only. Their function may be carried out through the operation of various components, program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named manufacturer.

This invention provides systems, methods, computer programs, and/or computer program products for remotely accessing, activating, deactivating, monitoring, communicating with, and/or otherwise managing a Voice-Over Internet Protocol (VoIP) communications device (and/or other peripheral hardware and equipment in proximity to and/or in communications with the VoIP communications device) in response to an emergency communication originating from the VoIP communications device. Typically, a calling party uses the VoIP communications device (or, alternate voice/data communications device) to communicate an emergency communications signal over a telecommunications network and/or a data network to an emergency communications address (e.g., a public safety answering point (PSAP) associated with a "9-1-1" call, a user-identified emergency communications address, such as a telephone number or an electronic communications address associated with a medical care provider, and so on). The telecommunications network and/or the data network detects, decodes, and/or connects the emergency communications signal to the emergency communications address or to an associated PSAP (or other associated emergency response center) and establishes a communications link. A responder communications device of the emergency communications address detects and decodes the emergency communications signal to obtain a communications address (e.g., a telephone number, an electronic communications address such as, for example, an IP address, a URL address, or an email address, and others) of the VoIP communications device (and/or of the peripheral hardware and equipment), emergency information, an emergency data communications address, and/or remote activation information. Thereafter, an emergency remote control computer software product (also referred to herein as the "Emergency Remote Control Communications Module (ERCCM)") of the responder communications device (i.e., the responder communications device and/or another communications device of an emergency service provider, or, alternatively a telecommunications and/or data network component) generates and communicates an emergency remote control communications signal to the VoIP communications device (and/or peripheral hardware and equipment) via the telecommunications network and/or the data network. When a communications link between the VoIP communications device (and/or peripheral hardware equipment) and the responder communications device communicates the emergency remote control communications signal, the emergency remote control communications signal instructs and/or commands access to, monitoring of, activation of, deactivation, and/or other management of subsystems of the VoIP communications device (and/or the peripheral hardware and equipment). For example, the responder communications device may use the remote activation information that identifies and provide operating parameters for a location position system of the VoIP communications device. And, the Emergency Remote Control Communications Module may generate an emergency remote control communications signal to activate the location co-ordinate system of the VoIP communications device and receive up-to-date and/or real time positioning information of the VoIP communications device. In addition, the emergency remote control communications signal may instruct the telecommunications network and/or data network (and/or the VoIP communications device) to not activate and/or to deactivate an alert of an incoming communication from the responder communications device. For example, if the calling party of the VoIP communications device calls to report a violent crime, a kidnapping, and/or another sensitive emergency and the communications link is interrupted and/or terminated, then the responder communications device may communicate the emergency remote control communications signal with instructions to the telecommunications network, the data network, and/or the VoIP communications device (and/or peripheral hardware and equipment) to quietly connect the emergency remote control communications signal without activating an alert such as a ringer, vibrator, visual indicator (e.g., flashing light), and/or another sensory device of the VoIP communications device (and/or peripheral hardware and equipment).

Referring now to the figures, FIG. 1 illustrates an operating system according to embodiments of this invention. FIG. 1 is a block diagram showing the Emergency Remote Control Communications Module 110 residing in a computer system shown as voice/data communications device 100 (also referred to as the "responder communications device"). As FIG. 1 shows, the Emergency Remote Control Communications Module 110 operates within a system memory device. The Emergency Remote Control Communications Module 110, for example, is shown residing in a memory subsystem 114. The Emergency Remote Control Communications Module 110, however, could also reside in flash memory 126 or a peripheral storage device 116. The voice/data communications device 100 also has one or more central processors 102 executing an operating system. The operating system, as is well known in the art, has a set of instructions that control the internal functions of the voice/data communications device 100. A communications interface 104 communicates signals, such as an emergency communications signal and/or a remote control communications signal (shown as "emergency communication" reference numeral 242 in FIGS. 2-8), data signals, control signals, and/or address signals, between the central processor 102 and a system controller 108 (typically called a "Northbridge"). Additionally, the communications interface 104 has a means to communicate a communications signal (e.g., shown as "emergency communication" reference numeral 242 in FIGS. 2 and 7 and "remote control communication" reference numeral 342 in FIGS. 3-6 and 8), data signals, control signals, and/or address signals) between the voice/data communications device 100 and a communications network (e.g., a data network and/or telecommunications network).

The system controller 108 provides a bridging function between the one or more central processors 102, a graphics subsystem 106, a keyboard subsystem 136, an audio subsystem 112, the memory subsystem 114, a PCI (Peripheral Controller Interface) bus 142, and a Communications ("Comm") Device Interface 150. The PCI bus 142 is controlled by a Peripheral Bus Controller 124. The Peripheral Bus Controller 124 (typically called a "Southbridge") is an integrated circuit that serves as an input/output hub for various peripheral ports and/or transceivers. These peripheral ports allow the voice/data communications device 100 to communicate with a variety of devices through networking ports (such as SCSI or Ethernet) and/or transceivers that include Wireless Communications ("Comm") Device Transceiver 126 (for communication of any frequency signal in the electromagnetic spectrum, such as, for example, Wireless 802.11 and Infrared) and Wired Communications ("Comm") Device Port/Connection 128 (such as modem V90+ and compact flash slots). These peripheral ports could also include other networking ports, such as, a serial port (not shown) and/or a parallel port (not shown). The Comm Device Interface 150 allows the voice/data communications device 100 to monitor, detect, receive, and decode incoming communications signals to the communications device(s) connected to the Wireless Comm Device Transceiver 126 and/or the Wired Comm Device Port/Connection 128. Further, the Comm Device Interface 150 transmits a communications signal (such as an emergency communications signal and/or an emergency remote control communications signal) to the Wireless Comm Device Transceiver 126 and/or the Wired Comm Device Port/Connection 128. Still further, the voice/data communications device 100 may include a power source 160, such as a rechargeable battery to provide power and allow the voice/data communications device 100 to be portable. Additionally, those of ordinary skill in the art understand that the program, processes, methods, and systems described in this patent are not limited to any particular computer system or computer hardware.

Those of ordinary skill in the art also understand the central processor 102 is typically a microprocessor. Advanced Micro Devices, Inc., for example, manufactures a full line of ATHLON™ microprocessors (ATHLON™ is a trademark of Advanced Micro Devices, Inc., One AMD Place, P.O. Box 3453, Sunnyvale, Calif. 94088-3453, 408.732.2400, 800.538.8450, www.amd.com). The Intel Corporation also manufactures a family of X86 and P86 microprocessors (Intel Corporation, 2200 Mission College Blvd., Santa Clara, Calif. 95052-8119, 408.765.8080, www.intel.com). Other manufacturers also offer microprocessors. Such other manufacturers include Motorola, Inc. (1303 East Algonquin Road, P.O. Box A3309 Schaumburg, Ill. 60196, www.Motorola.com), International Business Machines Corp. (New Orchard Road, Armonk, N.Y. 10504, (914) 499-1900, www.ibm.com), and Transmeta Corp. (3940 Freedom Circle, Santa Clara, Calif. 95054, www.transmeta.com). Those skilled in the art further understand that the program, processes, methods, and systems described in this patent are not limited to any particular manufacturer's central processor.

The operating system may be a UNIX® operating system (UNIX® is a registered trademark of the Open Source Group, www.opensource.org). Other UNIX-based operating systems, however, are also suitable, such as LINUX® or a RED HAT® LINUX-based system (LINUX® is a registered trademark of Linus Torvalds, and RED HAT® is a registered trademark of Red Hat, Inc., Research Triangle Park, N.C., 1-888-733-4281, www.redhat.com). Other operating systems, however, are also suitable. Such other operating systems would include a WINDOWS-based operating system (WINDOWS® is a registered trademark of Microsoft Corporation, One Microsoft Way, Redmond Wash. 98052-6399, 425.882.8080, www.Microsoft.com) and Mac® OS (Mac® is a registered trademark of Apple Computer, Inc., 1 Infinite Loop, Cupertino, Calif. 95014, 408.996.1010, www.apple.com). Those of ordinary skill in the art again understand that the program, processes, methods, and systems described in this patent are not limited to any particular operating system.

The system memory device (shown as memory subsystem 114 and/or peripheral storage device 116) may also contain an application program. The application program cooperates with the operating system and with a display unit to provide a Graphical User Interface (GUI). The Graphical User Interface typically allows a user to input a combination of signals (such as signals communicated from the audio subsystem 112, graphics subsystem 106, and/or keyboard subsystem 136 and/or alternative input devices). The Graphical User Interface provides a convenient visual and/or audible interface with the user (e.g., the emergency response call center and/or an emergency responder) of the voice/data communications device 100.

Figure 2:
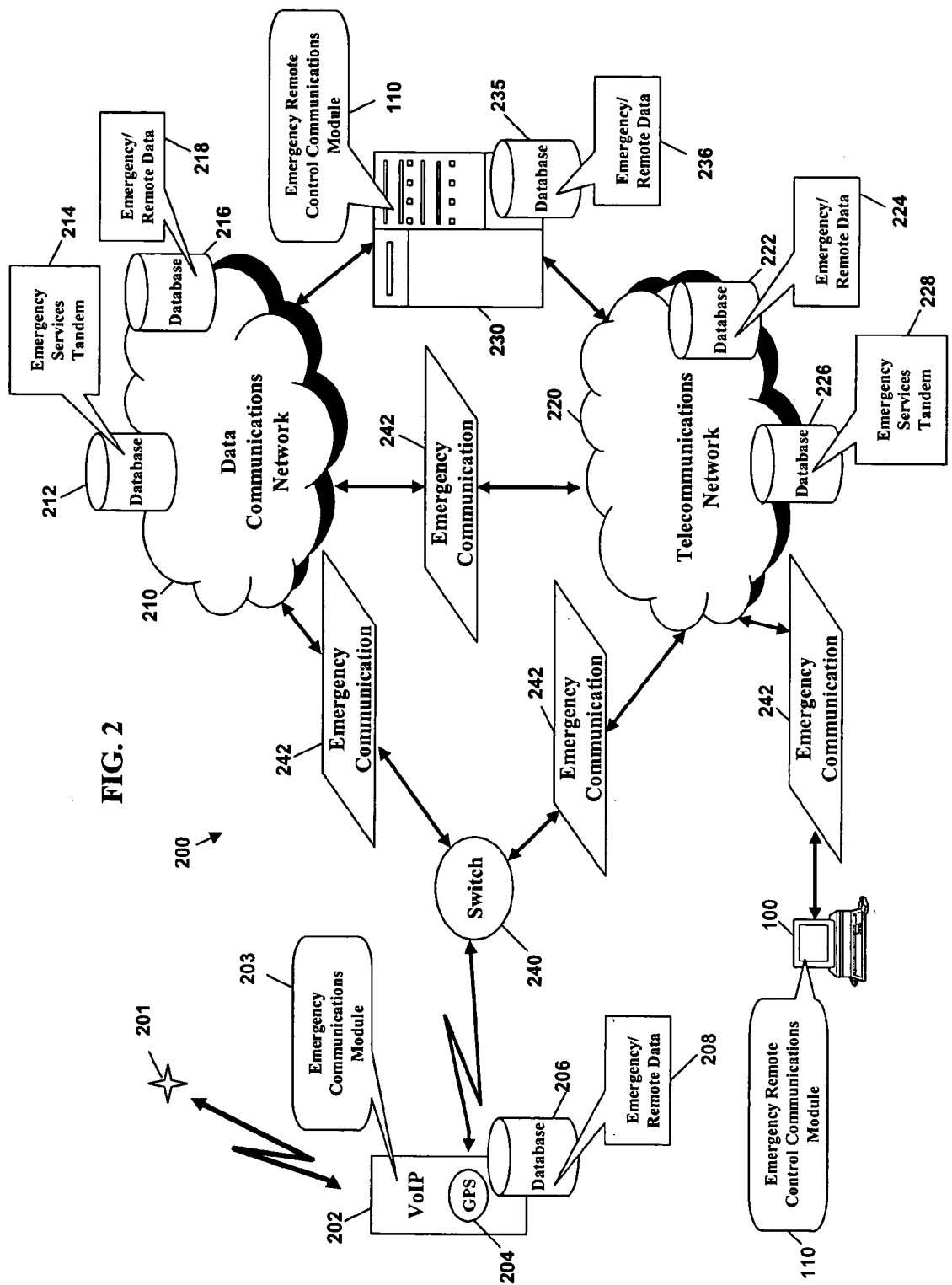
FIG. 2 illustrates an operating environment for providing emergency communications over one or more communications networks according to the embodiments of this invention.

Referring now to FIG. 2, an emergency remote control communications system 200 may include a satellite system 201, a VoIP phone 202 having an Emergency Communications Module 203, a global positioning system (GPS) 204, a database 206 of emergency data and/or remote activation data 208, an emergency communications signal (also referred to as "emergency communication") 242, a voice/data communications switch 240, a data communications network 210 including a database 212 of emergency services tandem data 214 and a database 216 of emergency data and/or remote activation data 218, a remote server 230 including the Emergency Remote Control Communications Module 110 and a database 235 with emergency data and/or remote activation data 236, a telecommunications network 220 having a database 222 of emergency data and/or remote activation data 224, a server/database 226 with emergency service tandem data 228, and the voice/data communications device 100 of an emergency response call center (e.g., a PSAP, a provider identified in an emergency communications address selected by a user of the VoIP communications device 202) having the Emergency Remote Control Communications Module 110. According to embodiments of this invention, the Emergency Communications Module 110 associates an emergency communications profile and other information with a communications signal (e.g., voice and/or data signal) addressed to an emergency communications address, and then communicates the emergency communications signal 242 to the voice/data communications device 100 via the data network 210 and/or telecommunications network 220. The emergency communications profile may include a matched, user-defined emergency communications address, an associated emergency communications addresses (e.g., if "9-1-1" is matched, then also associate Dr. Smith's communications address to communicate the emergency communications signal), emergency data (e.g., medical information, personal information, and other information), remote activation data (e.g., hardware and equipment information of the VoIP communications device 202 and/or peripheral communications devices, authorization codes, control parameters including an override code, and other associated remote activation data), and a communications link for accessing remotely stored emergency data and/or remote activation data (e.g., an emergency data communications address of a remote database). The data communications network 210 and/or the telecommunications network 220 detects, decodes, and processes the emergency communications signal 242 to the emergency communications address of the voice/data communications device 100. If a reader desires a detailed explanation of processing the emergency communications signal 242, then the reader is directed to applicant's co-pending applications entitled "E911 Systems and Methods for VoIP/VoN," filed on Apr. 30, 2004, and entitled "Method and System for Routing Emergency Data Communications," filed on May 27, 2004, of which the "Brief Summary of the Invention" and "Detailed Description of the Invention" sections of each application are incorporated herein by this reference.

Figure 3:
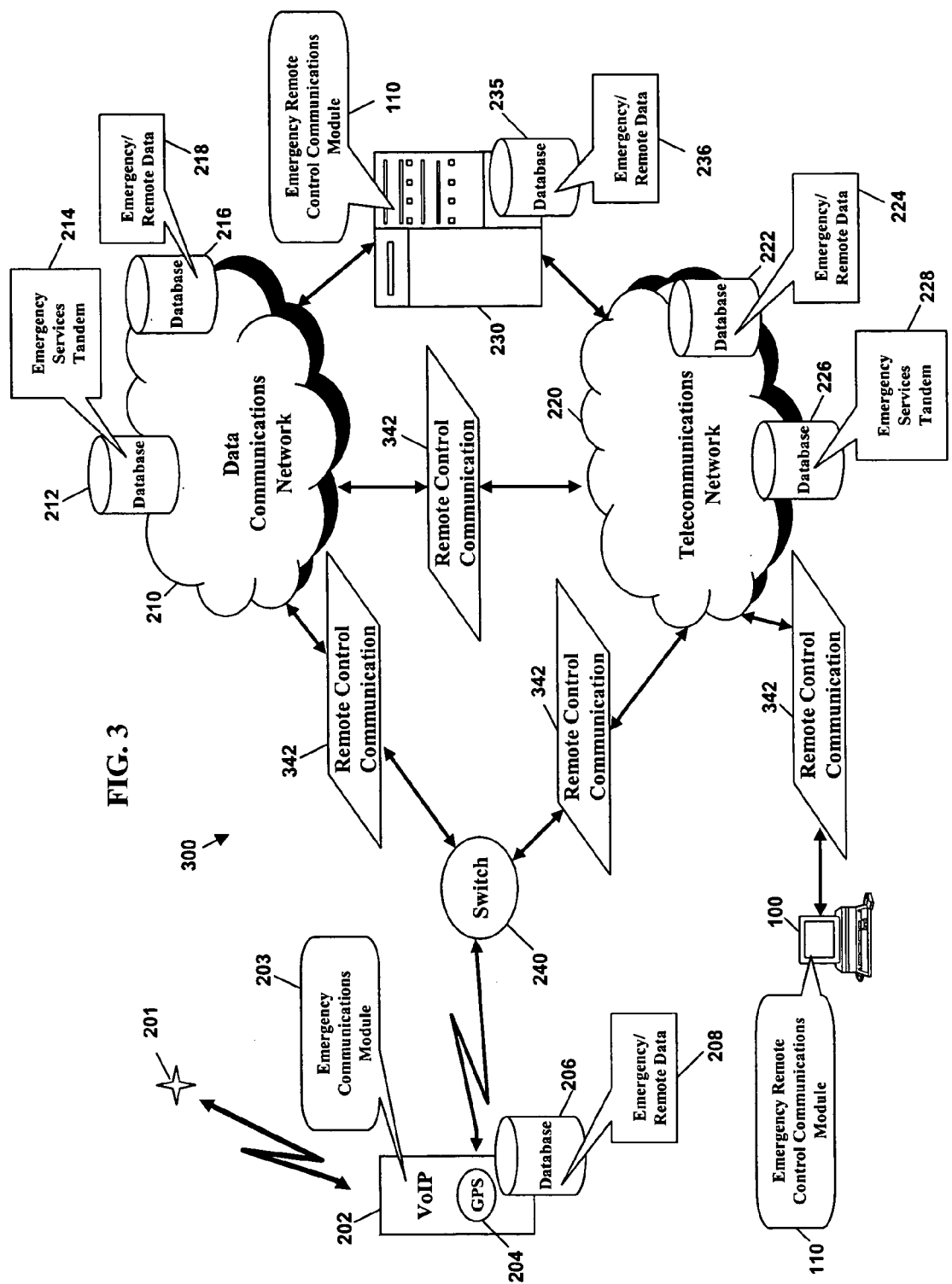
FIG. 3 illustrates an operating environment for providing emergency remote control communications over one or more communications networks according to the embodiments of this invention.

Thereafter, the Emergency Remote Control Communications Module 110 of the voice/data communications device 100 detects and analyzes the emergency communications signal 242 to generate an emergency remote control communications signal (shown as reference numeral 342 of FIG. 3). FIG. 3 illustrates an emergency remote control communications system 300 similar to the emergency remote control communications system 200 of FIG. 2; however, the emergency remote control communications system 300 shows the communication of an emergency remote control communications signal (also referred to as "remote control communication") 342 from the voice/data communications device 100 to the VoIP communications device 202 via the telecommunications network 220, the data network, and/or the remote server 230. The emergency remote control communications signal 342 may include (1) a response communications signal (e.g., voice and/or data signal), (2) a communications address of an emergency site communications device (e.g., the VoIP communications device 202 and/or peripheral hardware and equipment), (3) a responder's communications address (e.g., the communications address of the voice/data communications device 100), (4) a control parameter for accessing the emergency site communications device, (5) a control parameter for activating the emergency site communications device, (6) a control parameter for deactivating the emergency site communications device, (7) a control parameter for monitoring the emergency site communications device, (8) a control communications parameter for communicating with the emergency site communications device, and/or (9) an override parameter for terminating the remote control communications signal 342. The Emergency Remote Control Communications Module 110 communicates the emergency remote control communications signal 342 to the telecommunications network 220 and/or to the data communications network 210 that analyzes the emergency remote control communications signal 342 for routing and/or further processing. For example, if the telecommunications network 220 detects an emergency remote control communications signal 342 having a parameter for deactivating an alert (e.g., audio, visual, and/or other sensorial indicator) of an incoming communications signal (e.g., the incoming emergency remote control communications signal 342), then the telecommunications network 220 may deactivate the alert when the alert is a telecommunications network-activated alert (e.g., a "ring" of a telecommunications switch). If, however, the telecommunications network 220 detects a parameter of the emergency remote control communications signal 342 that includes a specialized instruction for the emergency site communications device, then the telecommunications network 220 processes and communicates the emergency remote control communication signal 342 to the emergency site communications device, and the specialized instruction is communicated directly to the emergency site communications device for processing and responding to the specialized instruction.

When creating the emergency remote control communications signal 342, the responder (e.g., the user of the voice/data communications device 100) may interact with a GUI of the Emergency Remote Control Communications Module 110 to input and/or to select the response communications signal, the communications address of the emergency site communications device, the responder's communications address, the control parameter, the override parameter, and/or other administrative and communications options. Alternatively, the emergency communications profile of the emergency communications signal (shown as reference numeral 242 of FIG. 2) may contain default parameters, such as a database of available control parameters associated with the emergency site communications device. For example, if the emergency site communications device is the VoIP communications device 202 having the positioning system 204, then default control parameters for the positioning system 204 may include (1) a control parameter for activating the positioning system and (2) a control parameter for deactivating the positioning system. Further, the remote activation data may include any information that the user inputs and/or selects to communicate with the emergency communications signal. The remote activation data may include audio files, pictures, charts, data files, and/or any other electronic data that augments, explains, and/or accompanies the emergency communications signal and/or the emergency remote control communications signal 342 for controlling access to, activation of, deactivation of, communications with, and/or management of the VoIP communications device 202 and/or of peripheral hardware and equipment in proximity to or in communications with the VoIP communications device 202. For example, as the user and the responder converse via a telephone connection of the emergency communications signal 242, the responder may simultaneously view or listen to this remote activation data and obtain information about a video surveillance system (shown as reference numeral 422 of FIG. 4), and then initiate the remote control communications signal 342 to activate and/or to communicate "live" (and/or archived) video surveillance data of the video surveillance system to the voice/data communications device 100 so that the responder can see and/or search for helpful information.

When the telecommunications network 220 and/or the data network 210 detects and decodes the emergency remote control communications signal 342, the emergency remote control communications signal 342 may be further associated with a communications address for accessing remote activation data (and/or emergency data). If the remote activation data is remotely stored, then the data network 210 and/or the telecommunications network 220 may communicate the emergency data communications address with the emergency remote control communications signal 342 or, alternatively, may access the emergency data communications address to push the remotely stored remote activation data (and/or the emergency data) to the emergency site communications device (shown as the VoIP communications device 202). According to the embodiments shown in FIG. 3, if the emergency communications address is an address of the data network 210 such as database 216, then the telecommunications network 220 may access the database 216 to retrieve, bundle, and/or otherwise process the remote activation data 218 with the emergency remote control communications signal 342 for more direct communication of the remote activation data 218 from the telecommunications network 220 to the VoIP communications device 202. Similarly, the data network 210 may access the database 222 of the telecommunications network 220 to retrieve, bundle, and/or otherwise process the remote activation data 224 for more direct communication to the VoIP communications device 202. If, however, the remote activation data 208 is locally stored on the database 206 of the VoIP communications device 202, then the remote activation data may be indirectly associated and/or otherwise communicated from the VoIP communications device 202 with the emergency communications signal (reference numeral 242 shown in FIG. 2) and/or subsequently accessed via the emergency remote control communications signal 342 after the initial communication of the emergency communications signal. Some of the remote activation data may be stored on the database 206 of the VoIP communications device 202 and some of the remote activation data may be remotely stored.

Because the VoIP communications device 202 of FIGS. 2 and 3 may operate in a wireless environment, the VoIP communications device 202 may originate the emergency communications signal 242 from any location having access to the data network 210 and/or the telecommunications network 220. For example, the user may initiate the emergency communications signal 242 in one location, but then, as the user moves about (or if the VoIP communications device 202 is moved by another means) during the emergency communications connection, the location of the VoIP communications device 202 changes. An advantage of this invention is to pinpoint up-to-date location co-ordinates and communicate these co-ordinates to the emergency service personnel responding to the emergency communications. According to an embodiment, the Emergency Remote Control Communications Module 110 enables the responder to activate the positioning system 204 of the VoIP communications device 202 and retrieve updated location co-ordinates. An example might be when the user of VoIP communications device 202 calls "9-1-1" from a burning building to request help. The user may initiate the emergency communications signal 242 from a third floor of the building, and in an attempt to exit the building; the user may change his location to another floor. If the emergency response personnel arrives at the emergency site and is trying to locate the user, then the responder may communicate the emergency remote control communications signal 342 to retrieve the up-to-date co-ordinates and then provide these updated co-ordinates to on-site emergency response personnel. These up-to-date co-ordinates may provide more precise information on the user's proximate location (if the user still has the VoIP communications device 202 with the positioning system 204) than say a location that may be transmitted when the user first places the call to 9-1-1.

Figure 4:
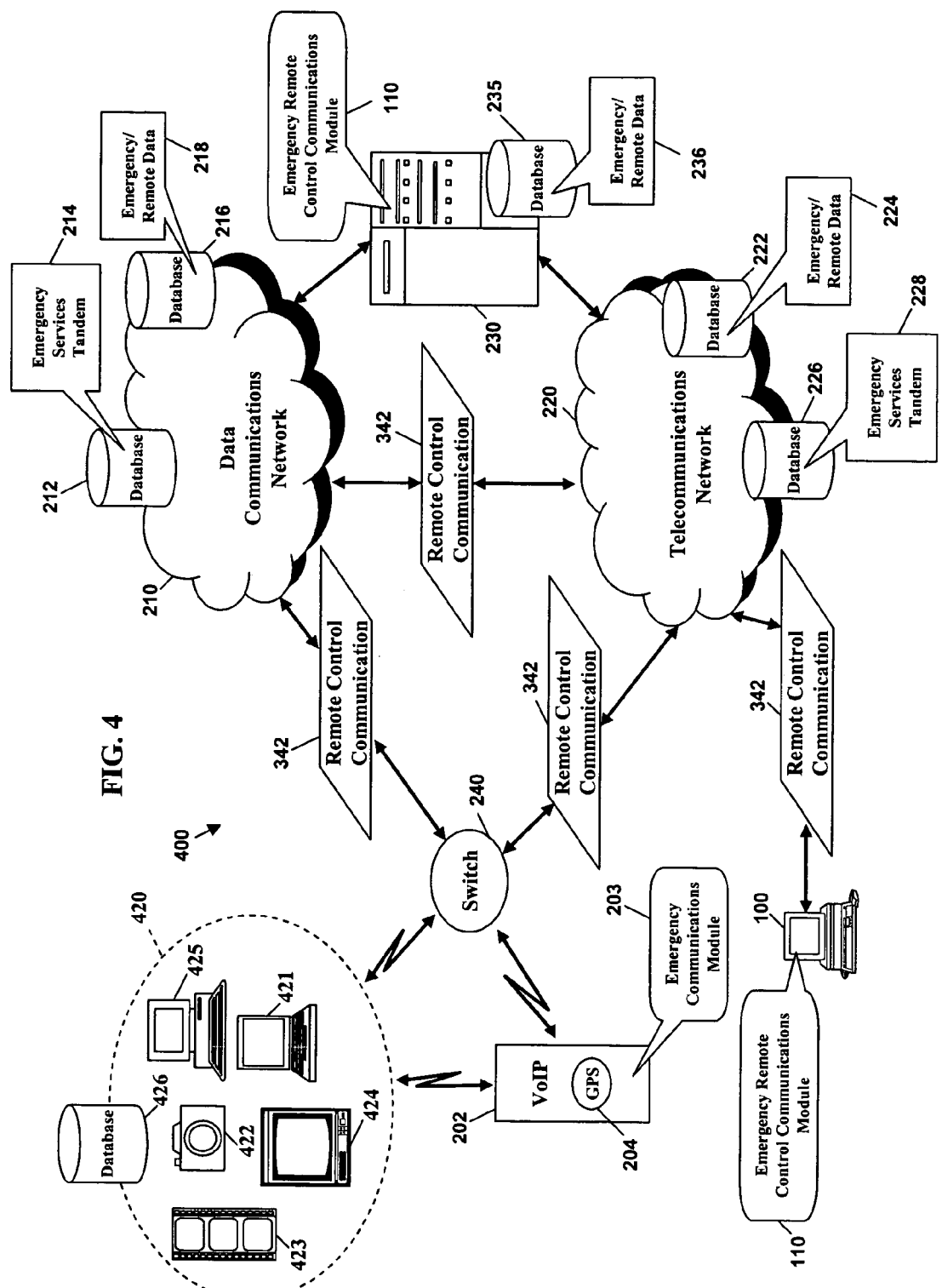
FIG. 4 illustrates another operating environment for providing emergency remote control communications over one or more communications networks according to the embodiments of this invention.

FIG. 4 illustrates an emergency remote control communications system 400 similar to the emergency remote control communications system 300 of FIG. 3; however, the emergency remote control communications system 400 further includes various peripheral hardware and equipment 420 (also referred to as an "emergency site communications device") that communicate with the VoIP communications device 202, the data communications network 210, and/or the telecommunications network 220. The peripheral hardware and equipment 420 may include a portable computing device 421, an audio video (AV) surveillance device 412, a multi-media file 423, an Interactive television 424, a personal computer 425, and/or a database 426 of archived data associated with the remote activation data. For example, the voice/data communications device 100 may have an established communications connection (via the emergency communications signal 242 of FIG. 2) with the VoIP communications device 202, and communicate the emergency remote control communications signal 342 either directly or indirectly (via the VoIP communications device 202) to the AV surveillance device 412 to access and retrieve audio and/or video data. According to further embodiments of this invention, the emergency site communications device may include a computer software product such as, information systems (e.g., word processing, group calendars, communications directory, accounting programs, inventory management programs, order processing programs, customer services programs, and so on). Still further, the peripheral hardware and equipment may include systems that provide security, fire protection, HVAC and/or other environmental systems, lighting, an appliance application (e.g., an interface allowing control of an appliance such as a refrigerator, oven, and others), and/or a communications interface to a transportation management application (e.g., a vehicle such as a car, truck, motorcycle, boat, airplane, and others).

Figure 5:
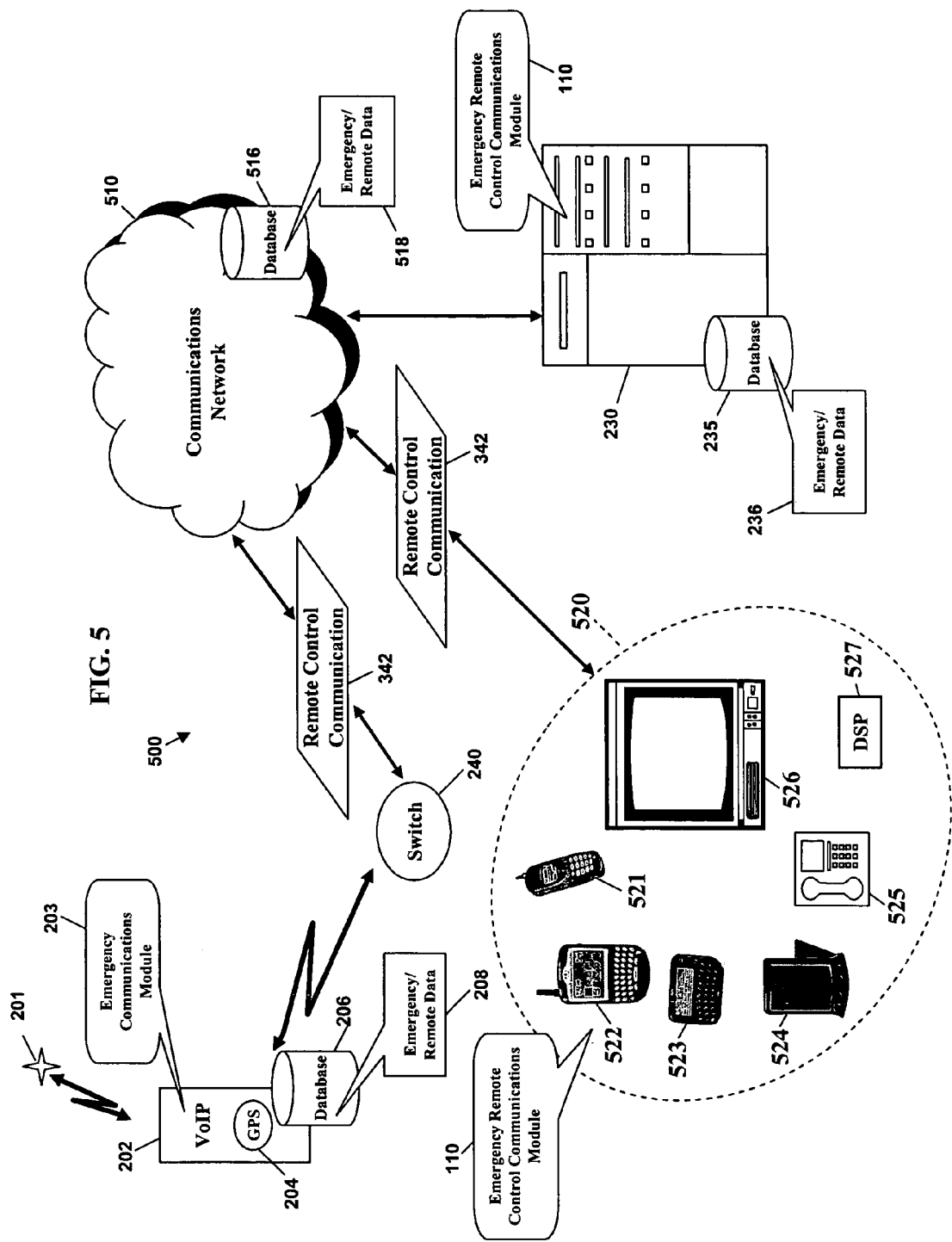
FIG. 5 illustrates various communications devices for providing emergency remote control communications over one or more communications networks according to the embodiments of this invention.

FIG. 5 illustrates another emergency remote control communications system 500 similar to the emergency remote control communications system 300 of FIG. 3; however, the emergency remote control communications system 500 illustrates alternate communications devices 520 and one communications network 510 representing the data communications network 210 and the telecommunications network 220 shown as separate components in FIGS. 3-4 to illustrate an operating of a hybrid communications network that operates with today's voice and/or data communications devices 520. The alternate voice/data communications devices may include a cellular phone 521, a VoIP phone 522, an interactive pager 523, a personal digital assistant 524, a Plain Old Telephone (POTS) phone 525, an interactive television 526, and/or any communications device having a digital signal processor (DSP) 527. Similar to the above described embodiments, the alternate voice and/or data communications device 520 communicates the emergency remote control communication signal 342 to the communications network 510 for processing and communication to the VoIP communications device 202 (and/or peripheral hardware and equipment). According to this embodiment, remote activation data may be stored in a database 516 of the communications network 510, the database 206 of the VoIP communications devices 100, and/or in the database 235 of remote server 230. That is, a communications switch (not shown) of the communications network 510 may detect and decode the emergency remote control communications signal 342 (and/or the emergency communications signal 242 of FIG. 2) to identify and access the emergency communications address(es) of the remote server 230, the communications network 501, and/or the VoIP communications device 202 to retrieve, bundle, and/or otherwise process the emergency remote control communications signal 342. The communications switch may interface the communications network 510 via a packet protocol, such as Session Initiation Protocol (SIP) and/or may utilize voice service protocols, triggers, and/or operations that allow telecommunications components (e.g., components of a Public Switched Telephone Network (PSTN)) and data communications network components (e.g., a world wide distributed computing network such as the Internet, Intranet, and/or Extranet) to interoperate. For example, the communications switch may be a packet-based "softswitch" that uses software control to provide voice, data, and video services by dynamically changing its connection data rates and protocols types. The communications switch may alternatively or additionally include Advanced Intelligent Network (AIN) componentry. The signaling between the alternate voice and/or data communications devices 520, the communications switch, and the communications network 510, however, is well understood in the art and will not be further described. If a reader desires a more detailed explanation, the reader is directed to U.S. Pat. No. 5,430,719 issued to Weisser (Jul. 4, 1995), with the "Summary of the Invention" and the "Detailed Description of the Preferred Embodiment" sections incorporated herein by reference. The reader is also directed to U.S. Pat. No. 5,917,817 issued to Dunn et al. (Jun. 29, 1999), with the "Summary of the Invention" and the "Detailed Description" sections incorporated herein by reference.

Figure 6:
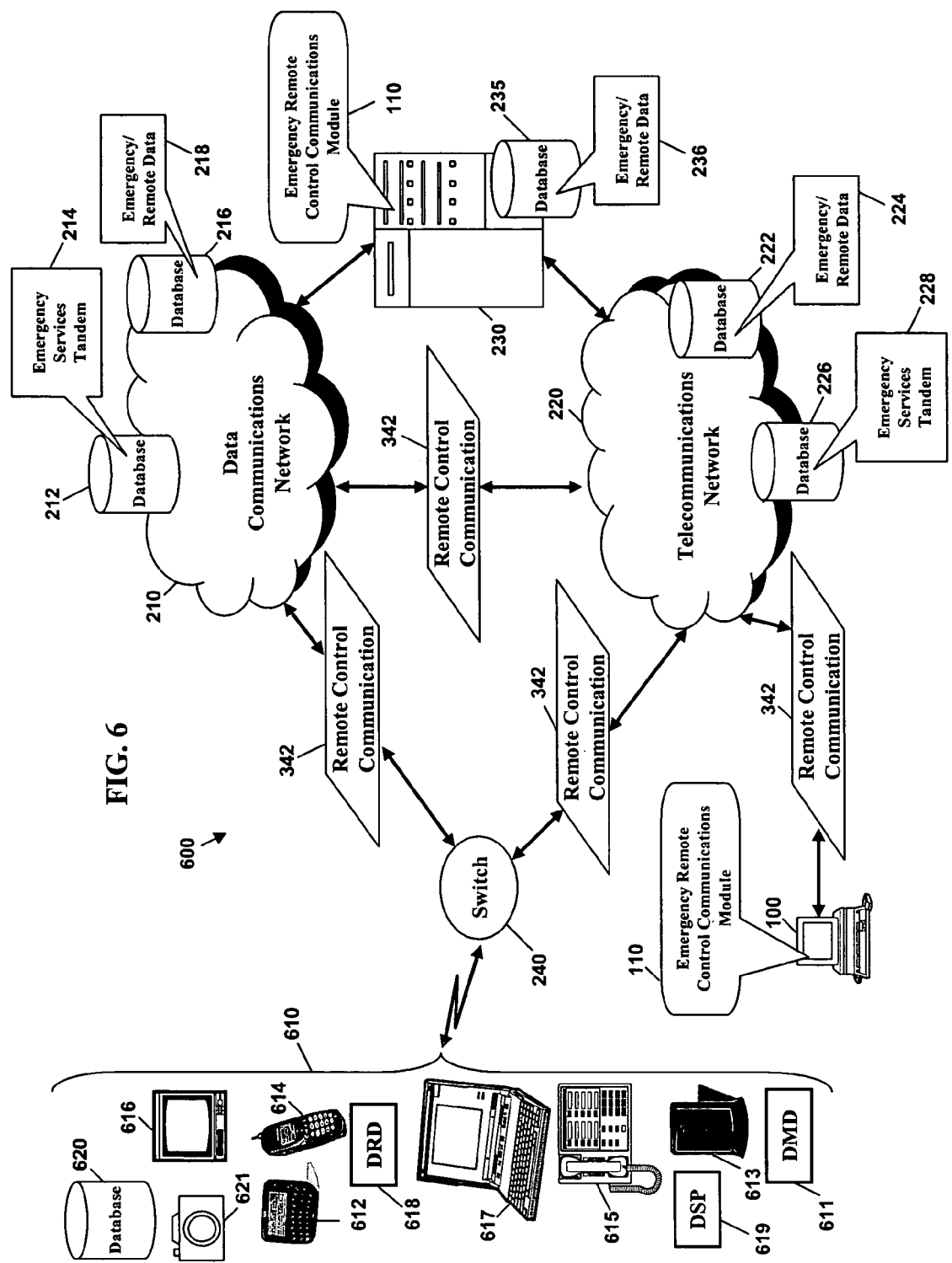
FIG. 6 illustrates an operating environment for providing emergency remote control communications to various emergency site communications devices over one or more communications networks according to the embodiments of this invention.

FIG. 6 illustrates an emergency remote control communications system 600 similar to the emergency remote control communications system 300 of FIG. 3; however, emergency remote control communications system 600 illustrates alternative communications devices and/or peripheral hardware and equipment 610 that may be used instead of the VoIP communications device of FIG. 3 for receiving and/or otherwise communicating the emergency remote control communications signal 342 generated by the Emergency Remote Control Communications Module 110 of the voice/data communications device 100. The various alternate communication devices 610 include a digital music device (DMD) 611, an interactive pager 612, a personal digital assistant (PDA) 613, a cellular phone 614, a POTS phone 615, an interactive television 616, a laptop computer system 617, a digital recording device (DRD) 618, a digital signal processor (DSP) 619, a database/server 620, and an audio and/or video surveillance system 621.

Figure 7:
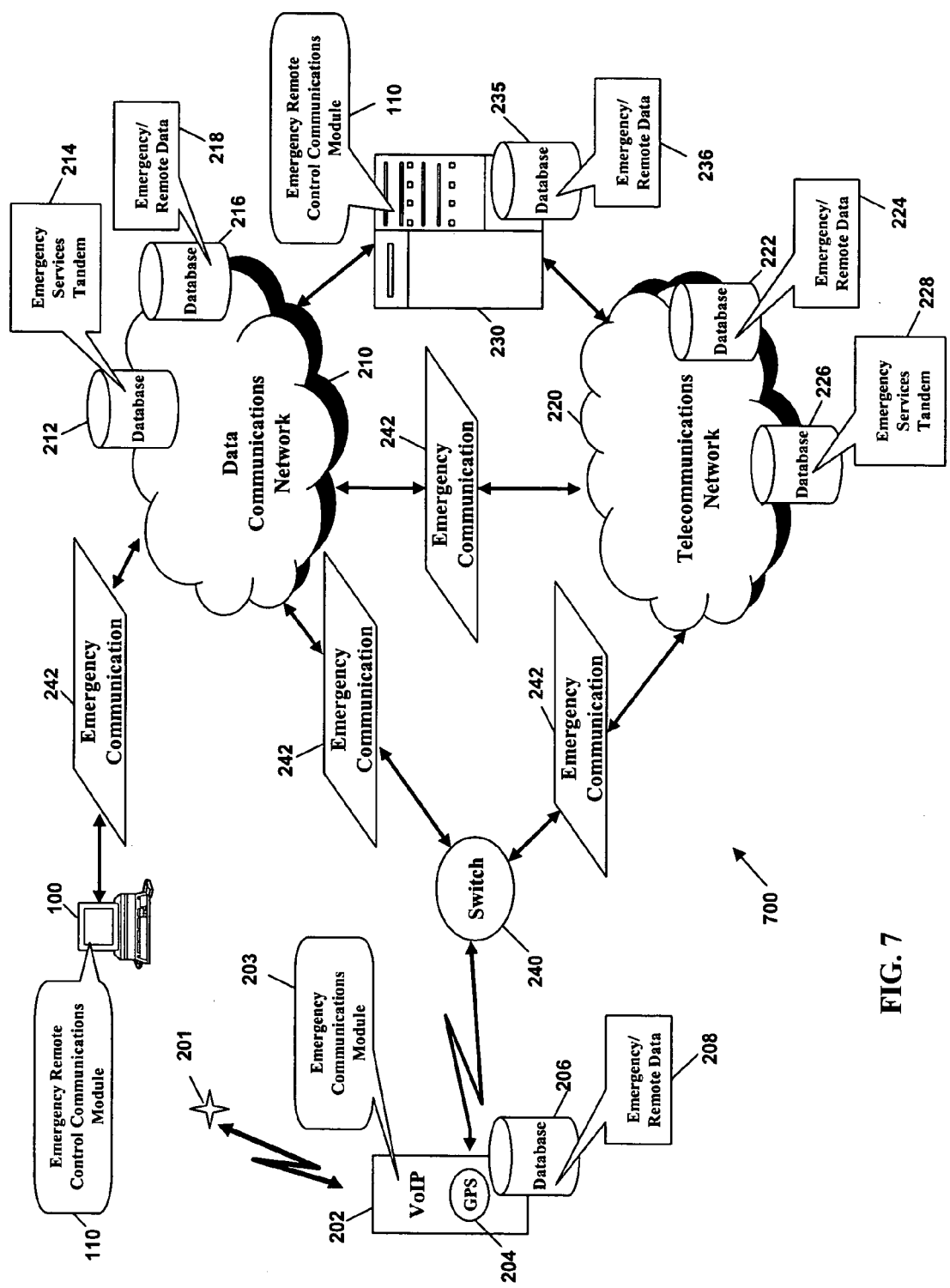
FIG. 7 illustrates another operating environment for providing emergency communications over one or more communications networks according to the embodiments of this invention.
Figure 8:
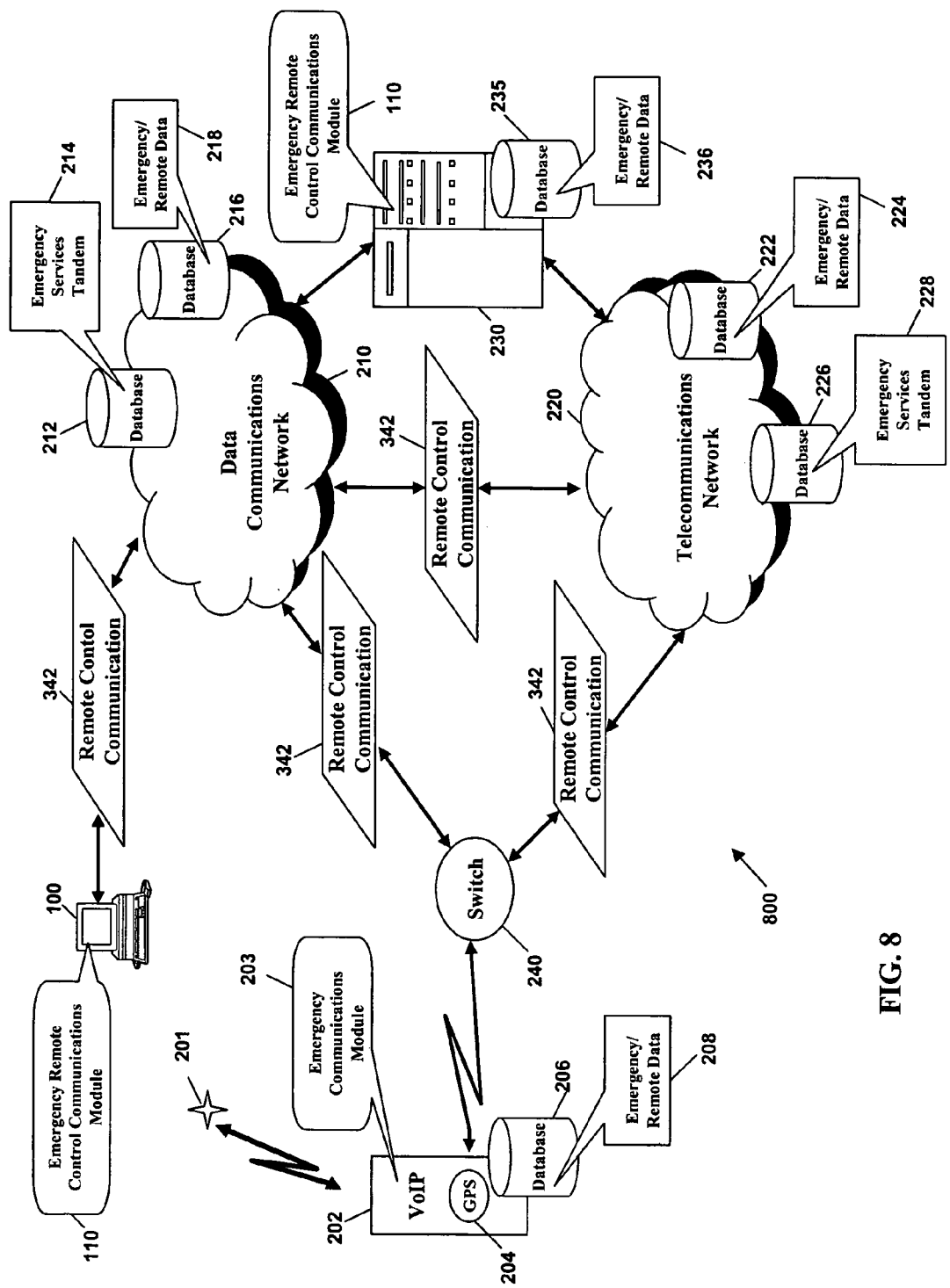
FIG. 8 illustrates still another operating environment for providing emergency remote control communications over one or more communications networks according to the embodiments of this invention.

FIGS. 7-8 illustrate emergency remote control communication systems 700 and 800 similar to the respective emergency remote control communications systems 200 and 300 of FIGS. 2 and 3; however, the emergency remote control communications systems 700 and 800 illustrate the voice/data communications device 100 having an electronic data communications address for communications with the data network 210 whereas the voice/data communications device 100 of FIGS. 2 and 3 had a telecommunications address (e.g., service node (SN) address and/or telephone number) for communications with the telecommunications network 220. Alternatively, the voice/data communications device 100 may communicate with a switch (not shown) similar to switch 240 of FIGS. 2 and 3 that enables the voice/data communications device to directly communicate via the data network 210 or the telecommunications network 220 (and, thus the voice/data communications device 100 may have both an electronic data communications address and a telecommunications address). If a reader desires a detailed explanation of processing of an emergency communications address having an electronic data communications address format, then the reader is directed to applicant's co-pending application entitled "Method and System for Routing Emergency Data Communications," filed on May 27, 2004, of which the "Brief Summary of the Invention" and "Detailed Description of the Invention" sections are incorporated herein by this reference.

The term "processing," as used herein, encompasses every event from the time the user of the VoIP communications device 202 (or alternate communications device(s) 610) inputs and/or selects a communications address (including an emergency communications address of the voice/data communications device 100 (or alternate communications devices 520)) for the communication of the emergency communications signal 242 to the termination of the communication of the emergency remote control communications signal 342 among the voice/data communications device 100, the data network 210, the telecommunications network 220, and/or the VoIP communications device 202 (or alternate communications device(s) 610). "Processing" of the emergency communications signal 242 and/or the emergency remote control communications signal includes routing a voice path and signaling setup and intelligence (e.g., Local Number Portability queries, queries to retrieve Calling Name/Number information, AIN queries, IP queries, standard signaling messages to determine call routing paths, and others). The term "processing" also includes monitoring an established connection between the voice/data communications device 100 and the VoIP communications device 202 for possible DTMF entry, switch hook flash, other events that indicate a party has requested something, and delivery of emergency data. "Processing," may further encompass billing activities and measurements at a switch or other network element.

Figure 9:
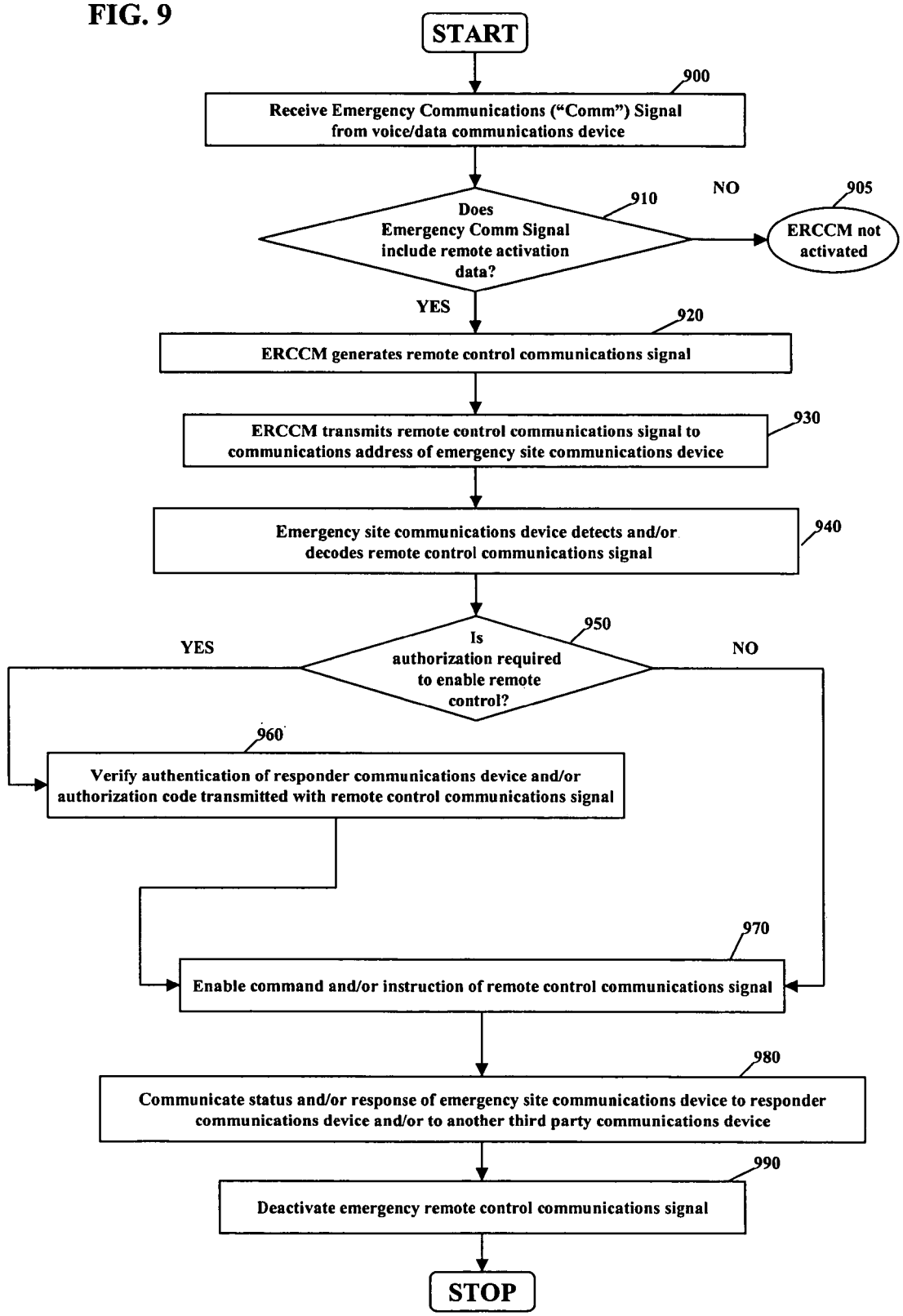
FIG. 9 is a flowchart illustrating a method for providing emergency remote control communications according to the embodiments of this invention.

FIG. 9 illustrates a flowchart showing an exemplary process of providing emergency remote control communications according to embodiments of this invention. A voice/data communications device receives an emergency communications signal from another voice/data communications device, such as a VoIP phone [block 900]. The voice/data communications device decodes the emergency communications signal to determine if the emergency communications signal includes remote activation data for accessing, monitoring, and/or otherwise controlling the VoIP phone (or, alternatively peripheral hardware and equipment in proximity to and/or in communications with the VoIP phone) [block 910]. If the emergency communications signal does not include remote activation data, then the method stops and an emergency remote control communications signal is not generated [block 905]. However, if the emergency communications signal does include remote activation data, then the method continues and an emergency remote control communications software product (referred to in FIG. 9 as "ERCCM) generates a remote control communications signal [block 920] and transmits the remote control communications signal to a communications address of an emergency site communications device (e.g., the VoIP phone and/or the peripheral hardware and equipment in proximity to and/or in communication with the VoIP phone) [block 930]. Thereafter, the emergency site communications device detects and decodes the remote control communications signal [block 940] to determine if authorization is required to enable remote control [block 950]. If authorization is required, then the method continues with verification of the responder communications device and/or an authorization code that may be manually entered and/or decoded with the remote control communications signal [block 960]. Then the remote control communications signal is communicated to the emergency site communications device and instructs the emergency site communications device to process a command of the remote control communications signal [block 970]. Thereafter, the emergency site communications device may communicate a response and/or a status to the responder communications device (or, alternatively, to a third party communications device) [block 980]. And then, the emergency remote control communications signal is terminated to the emergency site communications device [block 990]. Referring back to block 950, if however, authorization is not required, then the method continues with communication of the remote control communications signal to the emergency site communications device to instruct and/or otherwise enable the emergency site communications device to process a command of the remote control communications signal [block 970]. Thereafter, the emergency site communications device may communicate a response and/or a status to the responder communications device (or, alternatively, to a third party communications device) [block 980]. Finally, the emergency remote control communications signal is terminated to the emergency site communications device [block 990].

The Emergency Remote Control Communications Module (shown as reference numeral 110 in FIGS. 1-8) may be physically embodied on or in a computer-readable medium. This computer-readable medium may include CD-ROM, DVD, tape, cassette, floppy disk, memory card, and large-capacity disk (such as IOMEGA®, ZIP®, JAZZ®, and other large-capacity memory products (IOMEGA®, ZIP®, and JAZZ® are registered trademarks of Iomega Corporation, 1821 W. Iomega Way, Roy, Utah 84067, 801.332.1000, www.iomega.com). This computer-readable medium, or media, could be distributed to end-users, licensees, and assignees. These types of computer-readable media, and other types not mention here but considered within the scope of this invention, allow the Emergency Remote Control Communications Module to be easily disseminated.

The Emergency Remote Control Communications Module may be physically embodied on or in any addressable (e.g., HTTP, I.E.E.E. 802.11, Wireless Application Protocol (WAP)) wireless device capable of presenting an IP address. Examples could include a computer, a wireless personal digital assistant (PDA), an Internet Protocol phone, and/or a wireless pager.

While this invention has been described with respect to various features, aspects, and embodiments, those skilled and unskilled in the art will recognize this invention is not so limited. Other variations, modifications, and alternative embodiments may be made without departing from the spirit and scope of this invention.

What is claimed is:

1. A method, comprising:
receiving an emergency communications signal from a voice/data communications device to an emergency responder communications device, the emergency communications signal comprising at least one of (1) a communications signal, (2) a communications address for communicating with an emergency site communications device, (3) remote activation data associated with the emergency site communications device, (4) emergency data, and (5) an emergency data communications address for accessing the emergency data;
generating an emergency remote control communications signal comprising (1) a response communications signal, (2) the communications address of the emergency site communications device, (3) a control parameter for accessing the emergency site communications device, (4) a control parameter for activating the emergency site communications device, (5) a control parameter for deactivating the emergency site communications device, (6) a control parameter for monitoring the emergency site communications device, (7) a control communications parameter for communicating with the emergency site communications device, and (8) an override parameter for terminating the emergency remote control communications signal; and communicating the emergency remote control communications signal to the communications address of the emergency site communications device.

2. The method according to claim 1, wherein communicating the emergency remote control communications signal to the emergency site communications device comprises communicating the emergency remote control communications signal to the emergency site communications device via at least one of a telecommunications network, a satellite network, a private branch exchange network, a data network, and a mobile switching telephone network.

3. The method according to claim 1, wherein the voice/data communications device comprises at least one of a wireless communications device, a voice-over internet protocol phone, a pager, a computer, a digital music device, a digital recording device, a personal digital assistant, an interactive television, and a digital signal processor.

4. The method according to claim 1, further comprising:
using the emergency remote control communications signal to control at least one of communications with, access to, activation of, deactivation of, and monitoring of the emergency site communications device.

5. The method according to claim 1, further comprising:
communicating a subsequent communications signal to the responder's communications address, the subsequent communication signal comprising at least one of (1) a response of the emergency site communications device to the emergency remote control communications signal and (2) a status of the emergency site communications device.

6. The method according to claim 1, further comprising:
using the emergency remote control communications signal to control real-time monitoring of a positioning system of the voice/data communications device; and
communicating a subsequent communications signal to the responder's communications address with at least one location co-ordinate in response to the real-time monitoring.

7. A computer-readable medium storing processor-executable code for performing a method of emergency notification, the method comprising:
receiving an emergency communications signal from a voice/data communications device to an emergency responder communications device, the emergency communications signal comprising at least one of
(1) a communications signal,
(2) a communications address for communicating with an emergency site communications device,
(3) remote activation data associated with the emergency site communications device,
(4) emergency data, and
(5) an emergency data communications address for accessing the emergency data;
generating a an emergency remote control communications signal comprising
(1) a response communications signal,
(2) the communications address of the emergency site communications device,
(3) a control parameter for accessing the emergency site communications device,
(4) a control parameter for activating the emergency site communications device,
(5) a control parameter for deactivating the emergency site communications device, (6) a control parameter for monitoring the emergency site communications device,
(7) a control communications parameter for communicating with the emergency site communications device, and
(8) an override parameter for terminating the emergency remote control communications signal; and
communicating the emergency remote control communications signal to the communications address of the emergency site communications device.

8. The computer readable medium of claim 7, wherein the computer-readable medium is stored in a voice-over internet protocol wireless communications device.

9. The computer readable medium of claim 7, wherein the computer-readable medium is stored in a computer system.

10. The computer readable medium of claim 7, wherein the emergency communications signal and the emergency remote control communications signal are communicated via a communications network, the communications network comprising at least one of a telecommunications network, a data network, and a satellite network.

11. A system, comprising:
means for receiving an emergency communications signal from a voice/data communications device to an emergency responder communications device, the emergency communications signal comprising at least one of
(1) a communications signal,
(2) a communications address for communicating with an emergency site communications device
(3) remote activation data associated with the emergency site communications device,
(4) emergency data, and
(5) an emergency data communications address for accessing the emergency data:
means for generating a an emergency remote control communications signal comprising
(1) a response communications signal,
(2) the communications address of the emergency site communications device,
(3) a control parameter for accessing the emergency site communications device,
(4) a control parameter for activating the emergency site communications device
(5) a control parameter for deactivating the emergency site communications device, (6) a control parameter for monitoring the emergency site communications device,
(7) a control communications parameter for communicating with the emergency site communications device, and
(8) an override parameter for terminating the emergency remote control communications signal; and
communicating the emergency remote control communications signal to the communications address of the emergency site communications device.

12. The communications system of claim 11, wherein the emergency communications signal comprises at least one of (1) a communications signal from the voice/data communications device, (2) a communications address for communicating with an emergency site communications device, (3) remote activation data associated with the emergency site communications device, (4) emergency data, and (5) an emergency data communications address for accessing the emergency data.

13. The communications system of claim 12, wherein the remote activation data comprises at least one of (1) a communications address of the emergency site communications device, (2) a description of hardware and equipment of the emergency site communications device, (3) a responder's communications address associated with an emergency responder, (4) a parameter for accessing the emergency site communications device, (5) a parameter for activating the emergency site communications device, (6) a parameter for deactivating the emergency site communications device, (7) a parameter for monitoring the emergency site communications device, (8) a communications parameter for communicating with the emergency site communications device, and (9) an override parameter for terminating the emergency remote control communications signal.

14. The communications system of claim 12, wherein the emergency site communications device comprises at least one of the voice/data communications device and a peripheral communications device of an emergency site.

15. The communications system of claim 14, wherein the peripheral communications device of an emergency site comprises at least one of a security system, an HVAC control system, a lighting control system, an audio distribution system, a multimedia-on-demand system, an appliance system, an environmental management system, a communications system, a transportation vehicle management system, a visual monitoring system, a medical device, a positioning system, and an information management system.

16. The system of claim 15, wherein the information management system comprises at least one of an electronic calendar, a voice messaging system, a text messaging system, a video messaging system, an electronic to-do list, an electronic directory, a word processing system, a spreadsheet system, a presentation system, a medical information system, and a research system.

17. The communications system of claim 11, wherein the emergency remote control communications signal comprises at least one of (1) a response communications signal, (2) the communications address of the emergency site communications device, (3) a responder's communications address, (4) a control parameter for accessing the emergency site communications device, (5) a control parameter for activating the emergency site communications device, (6) a control parameter for deactivating the emergency site communications device, (7) a control parameter for monitoring the emergency site communications device, (8) a control communications parameter for communicating with the emergency site communications device, and (9) an override parameter for terminating the emergency remote control communications signal.

18. The communications system of claim 11, the Emergency Remote Control Communications Module further communicating with at least one of the communications network and an emergency communications module of the voice/data communications device to generate the emergency remote control communications signal.

19. The communications system of claim 11, the communications network comprising a world wide electronic data communications network having an emergency remote control user interface via at least one of an internet, an intranet, and an extranet.

20. The communications system of claim 11, wherein the responder's communications device comprises at least one of:
a POTS phone,
a voice over internet protocol communications device,
a wireless communications device,
a mobile phone,
a wireless phone,
a WAP phone,
a satellite phone
a computer,
a modem,
a pager,
a digital music device,
a digital recording device,
a personal digital assistant,
an interactive television,
a digital signal processor, and
a Global Positioning System device.

* * * * *